United States Patent

[11] 3,583,256

| [72] | Inventor | William G. Livezey<br>Indianapolis, Ind. |
|---|---|---|
| [21] | Appl. No. | 878,012 |
| [22] | Filed | Nov. 19, 1969 |
| [45] | Patented | June 8, 1971 |
| [73] | Assignee | General Motors Corporation<br>Detroit, Mich. |

[54] TRANSMISSION
8 Claims, 3 Drawing Figs.

| [52] | U.S. Cl. | 74/720.5, 74/687 |
|---|---|---|
| [51] | Int. Cl. | F16h 37/06, F16h 47/04 |
| [50] | Field of Search | 74/687, 720.5; 180/6.7 |

[56] References Cited
UNITED STATES PATENTS

| 3,174,362 | 3/1965 | Fisher et al. | 74/720.5 |
| 3,212,358 | 10/1965 | DeLalio | 74/687 |
| 3,492,891 | 3/1970 | Liverzey | 74/720.5 |

*Primary Examiner*—Arthur T. McKeon
*Attorneys*—W. E. Finken, A. M. Heiter and R. L. Phillips ABSTRACT: A transmission having a hydrostatic propulsion drive unit combined with range planetary gearing to provide in both forward and reverse a full hydrostatic drive in a low speed range and five hydromechanical drives in successively higher speed ranges with synchronous drive establishing device shifting, the transmission with dual output also having a separate hydrostatic steer drive unit combined with the gearing to provide steering.

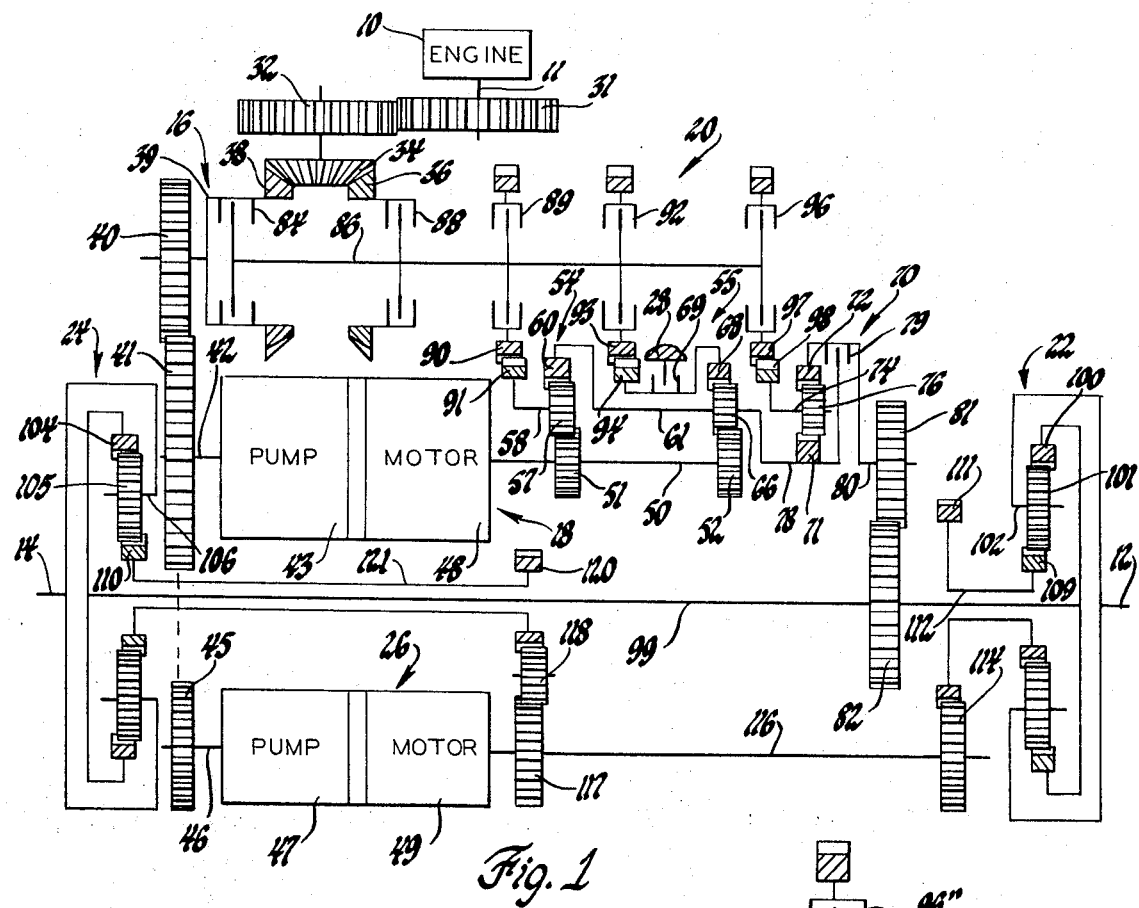
Fig. 1
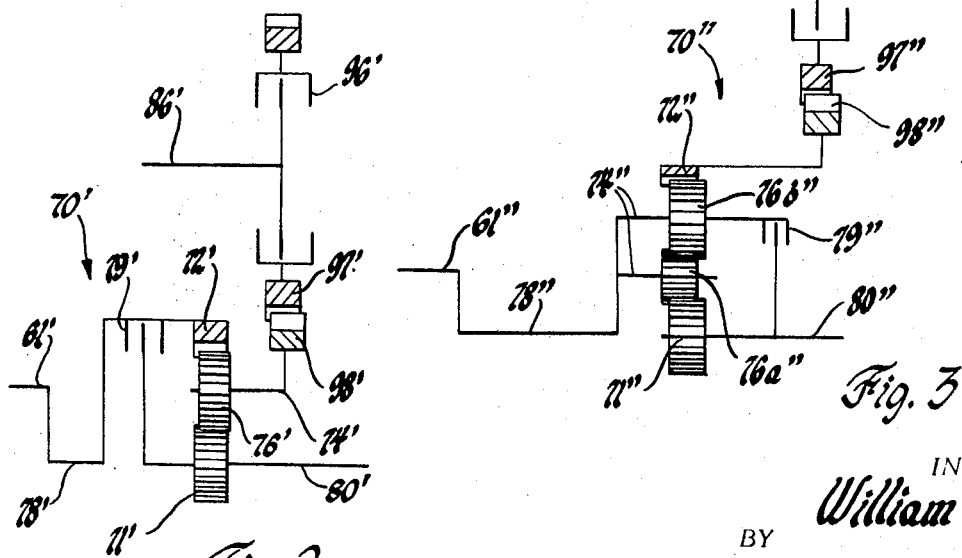
Fig. 2
Fig. 3
INVENTOR.
William G. Livezey
BY
Ronald L. Phillips
ATTORNEY

TRANSMISSION

This invention relates to vehicle transmissions and more particularly to transmissions providing full hydrostatic drive and hydromechanical drive.

The transmission according to the present invention, as illustrated in the preferred embodiment which has dual output for use in a track-laying vehicle, provides the same six speed range drives in forward and reverse with full hydrostatic drive in the lowest speed range and split torque or hydromechanical drive in five successively higher speed ranges with hydrostatic steering provided in all speed ranges. Propulsion drive is by a single hydrostatic propulsion drive unit acting with range planetary gearing which provides synchronized drive establishments at optimum shift points. In the range planetary gearing, first and second planetary gearsets serially provide for the first and lowest speed range drive which is the full hydrostatic drive; the first gearset receiving drive from the hydrostatic propulsion drive unit and providing torque multiplication and speed reduction and the second gearset receiving drive from the first gearset and being locked in this drive. The second speed range drive is provided by the second gearset remaining locked up and receiving hydromechanical drive from a third planetary gearset which receives mechanical drive from the transmission input and hydrostatic drive from the hydrostatic propulsion drive unit. The third speed range drive is provided by the second gearset remaining locked up and receiving hydromechanical drive from the first gearset which is now caused to receive mechanical drive from the transmission input in addition to hydrostatic drive. The fourth speed range drive is provided by unlocking the second gearset and having it receive mechanical drive from the transmission input in addition to hydromechanical drive from he first gearset. The fifth speed range drive is provided by having the second gearset continue to receive mechanical drive from the transmission and in addition receive hydromechanical drive from the third gearset. The sixth and highest speed range drive is provided by having the second gearset continue to receive mechanical drive from the transmission input and in addition receive hydrostatic drive via the first gearset. Thus, the second gearset provides a mechanical connection in the first three speed range drives and extends the normal speed range coverage of each of these drives with mechanical drive from the transmission input to effect the last three speed range drives without extending the hydrostatic propulsion drive unit's speed ratio coverage. The single output from the above arrangement is delivered to like planetary steer units which also serve as output gearing and deliver their separate outputs as propulsion drives to the vehicle's two tracks. Steering is provided by an input driven hydrostatic steer drive which provides drive to the planetary steer units to effect controlled differential steering.

An object of the present invention is to provide a new and improved transmission.

Another object is to provide a hydrostatic-mechanical transmission affording at least two hydromechanical drives with an arrangement of two planetary gearsets in which one gearset by being locked up receiving mechanical input expands the speed range normally made available by the other gearset.

Another object is to provide a transmission having three planetary gearsets effecting a hydrostatic drive and two hydromechanical drives with one of the gearsets locked up and his one gearset receiving mechanical input drive and cooperating with the other gearing to extend the speed range of each of the named drives to effect addition of three more drives.

Another object is to provide in a dual output transmission a single hydrostatic propulsion drive unit cooperating with planetary gearing comprising three planetary gearsets to provide a full hydrostatic drive in a low speed range and five hydromechanical drives in successively higher speed ranges with e shifting accomplished by drive establishing devices speed synchronized at optimum shift points and a single hydrostatic steer unit cooperating with output gearing to provide differential steering in all the drives.

these and other objects of the invention will be more apparent from the following description and drawing of the preferred embodiment of the invention.

FIG. 1 diagrammatically shows a dual output transmission according to the present invention.

FIG. 2 diagrammatically shows a modification of the FIG. 1 embodiment.

FIG. 3 diagrammatically shows another modification of the FIG. 1 embodiment.

The preferred embodiment of the transmission according to the present invention has dual output and provides the same six speed range drives in forward and reverse with full hydrostatic drive in the lowest speed range and split torque or hydromechanical drive in five successively higher speed ranges. These propulsion drives are accomplished by a single hydrostatic propulsion drive unit cooperating with planetary gearing and steering is obtained with a hydrostatic steer drive which cooperates with the gearing, steering being of the controlled differential type.

Referring to FIG. 1, the preferred embodiment of the transmission according to the present invention is for operatively drivingly connecting a track-laying vehicle's engine 10 to the vehicle's two tracks. The transmission generally comprises an engine powered input shaft 11 powering a right and a left track-powering transmission output shaft 12 and 14 through forward and reverse drive unit 16, a single hydrostatic propulsion drive unit 18, a synchronous shifting range gearing arrangement 20 comprising three planetary gearsets, and a right and a left speed differential or steer planetary gear unit 22 and 24. A single hydrostatic steer drive unit 26 is combined with the steer units 22 and 24 for the steering operation. All of these components are suitably supported in a housing 28. Both hydrostatic drive units which have infinitely variable speed ratios may be of conventional design with each unit's pump having infinitely variable displacement and each unit's motor having either fixed or variable displacement, the speed and direction of the motor output being controlled by the hydrostatic drive unit's displacement control mechanism which may also be conventional.

input to both the hydrostatic propulsion drive unit 18 and the hydrostatic steer drive unit 26 is provided by the input shaft 11 being connected to drive a spur gear 31. Gear 31 meshes with a spur gear 32 which is connected to drive a bevel gear 34 in the forward and reverse drive in unit 16. Gear 34 meshes at diametrically opposite sides with a bevel gear 36 and a bevel gear 38. Continuous input drive to both of the hydrostatic drive units is provided by connecting the bevel gear 38 via a drum 39 to a spur gear 40. Gear 40 meshes with a spur gear 41 which is connected by a shaft 42 to drive pump 43 of the hydrostatic propulsion drive unit 18. Gear 41 meshes, as shown diagrammatically, with a spur gear 45 which is connected by a shaft 46 to drive pump 47 of the hydrostatic steer drive unit 26. Alternatively, gear 45 could mesh with gear 40 rather than using gear 41 as an idler therebetween. Motors 48 and 49 of the respective hydrostatic drive units 18 and 26 may thus be powered by the engine.

Describing the propulsion portion of the transmission arrangement in further detail, the motor 48 of the hydrostatic propulsion drive unit 18 has its output shaft 50 connected to drive sun gears 51 and 52 of planetary gearsets 54 and 55, respectively, in the range gearing arrangement 20. In planetary gear set 54, sun gear 51 meshes with pinions 57 carried by a carrier 58 which may be mechanically driven by the transmission input as described in more detail later. Pinions 57 mesh with a ring gear 60 which is connected to carrier 61 of gearset 55. In gearset 55, sun gear 52 meshes with pinions 66 carried by carrier 61. Pinions 66 also mesh with a ring gear 68 which may be either held by engagement of a brake 69 or mechanically input driven as described in more detail later.

Planetary gearset 70 in the range gearing arrangement 20 comprises a sun gear 71, a ring gear 72 and a carrier 74 carrying pinions 76 meshing with this sun gear and ring gear. The sun gear 71 is connected by a shaft 78 to carrier 61 of gearset 55 and the carrier 74 may be mechanically driven by the transmission input as described in more detail later. The sun gear 71 and ring gear 72 may be connected by engagement of a clutch 79 to thus lock up gearset 70. The ring gear 72 which is the output of the range gearing arrangement 20 is connected by a shaft 80 to a spur gear 81. Gear 81 meshes with a spur gear 82 that is connected to drive the transmission's two output shafts 12 and 14 as described in more detail later.

Mechanical drives to gearsets 54, 55 and 70 are provided through the forward and reverse drive unit 16. The forward and reverse drive unit 16 has, in addition to those components previously described, a reverse drive clutch 84 whose drive members are connected to drum 39 and are thus connected to rotate with bevel gear 38. The driven member of reverse drive clutch 84 is connected to the left-hand end of a countershaft 86 which extends freely through bevel gear 38 and also through the opposed bevel gear 36 as shown. A forward drive clutch 88 has its drive members secured to bevel gear 36 and its driven member connected to countershaft 86 at an intermediate point. Thus when the reverse drive clutch 84 is engaged, the countershaft 86 is powered by the transmission input in one direction and, alternatively, when the forward drive clutch 88 is engaged, the countershaft 86 is powered in the opposite direction.

Further describing the mechanical drives to the range gearing, a clutch 89 arranged about countershaft 86 is for connecting his countershaft to a spur gear 90. Gear 90 meshes with a spur gear 91 which is connected to carrier 58 of gearset 54. The mechanical drive to gearset 55 is provided by a clutch 92 which is arranged about countershaft 86 and on engagement connects this countershaft to a spur gear 93. Gear 93 meshes with a spur gear 94 which is connected to ring gear 68 of gearset 55. The mechanical drive to gearset 70 is provided by a clutch 96 which is arranged about countershaft 86 and on engagement connects this countershaft to a spur gear 97. Gear 97 meshes with a spur gear 98 which is connected to carrier 74 of gearset 70.

Drive from the range gearing arrangement 20 to the transmission's two output shafts 12 and 14 is provided by connecting gear 82 to shaft 99. In the drives to the two output shafts 12 and 14, the right-hand end of shaft 99 is connected to ring gear 100 of the right steer planetary gear unit 22 which ring gear meshes with pinions 101 carried by a carrier 102 that is connected to the right output shaft 12. Similarly, the left-hand end of shaft 99 is connected to a ring gear 104 of the left steer planetary gear unit 24 which ring gear meshes with pinions 105 carried by a carrier 106 that is connected to the left output shaft 14, the left output shaft 14 being axially aligned with the right output shaft 12. Sun gear 109 of the right steer unit 22 and sun gear 110 of the left steer unit 24 are operatively connected by a direction reversing gear train. This gear train comprises a spur gear 111 which is connected by a sleeve shaft 112 to sun 109 and is in mesh with a spur gear 114. Gear 114 is connected to the right-hand end of a shaft 116. Shaft 116 is connected near its left-hand end to a spur gear 117 which meshes with an idler gear 118. Idler gear 118 meshes with a spur gear 120 which is connected by a sleeve shaft 121 to sun gear 110 of the left steer unit 24. Thus, this gear train with idler gear 118 will provide reaction to the sun gears 109 and 110 when the ring gears 100 and 104 are driven. For steering, the shaft 116 of this gear train is connected at its left-hand end to be driven by motor 49 of the hydrostatic steer drive unit 26.

Describing now a typical operation of this dual output transmission, for neutral either the reverse drive clutch 84 or forward drive clutch 88 may be engaged and all other drive establishing devices are disengaged to disconnect all power paths from the output shafts. In neutral, both of the hydrostatic drive units 18 and 26 are conditioned by their displacements so that they do not produce hydrostatic drive. Thus, in neutral both pumps 43 and 47 are motored by the engine 10 so that the hydrostatic propulsion drive unit 18 is readied for subsequent drive operation and the hydrostatic steer unit 26 is then available for steering which will now be described for this transmission condition.

In neutral, with no drive to shaft 99 and on operation of the hydrostatic steer drive unit 26 to power the shaft 116 in either direction, the ring gears 100 and 104, since they are connected by the shaft 99, provide reaction in the steer units 22 and 24. The sun gears 109 and 110 are driven in opposite directions at the same speed by the gear train connection therebetween which is receiving drive from the hydrostatic steer drive unit 26. The carriers 102 and 106 and thus output shafts 12 and 14 are driven at reduced speed relative to these driving sun gears and in the same direction as their driving sun gear. Thus, he output shafts 12 and 14 are driven at the same speed in opposite directions and thereby produce steering, the direction of vehicle turning being determined by the rotational direction of shaft 116.

In the immediately following operational description of the six speed range drives provided, the hydrostatic steer drive unit 26 is conditioned so that it does not power shaft 116, the description of steering operation in all speed range drives being deferred until later. In the first and lowest speed range drive, either the reverse drive clutch 84 or forward drive clutch 88 is engaged, and both the brake 69 and clutch 79 are engaged. For ease in understanding, it will be assumed that the engine 10 operates at a constant speed. Thus, the pump input shaft 42 of the hydrostatic propulsion drive unit 18 is driven at a constant speed which will be assumed to be its maximum value. In the first speed range drive, forward transmission drive which produces forward vehicle motion is obtained by operating the hydrostatic propulsion drive unit 18 to power the motor output shaft 50 and thus sun gear 52 of gearset 55 in what will be described as the forward direction. Since ring gear 68 is held by brake 69, the carrier 61 is caused to rotate in the forward direction at a reduced speed. The carrier 61 in turn drives the connected sun gear 71 of gearset 70 in the forward direction. Since clutch 79 is engaged, the gearset 70 is locked up and the ring gear 72 is therefore connected to and driven forwardly by sun gear 71. The ring gear 72 in turn drives the shaft 99 via gears 81 and 82. The shaft 99 drives ring gears 100 and 104 of the steer units in the direction producing forward vehicle motion while the gear train between sun gears 109 and 110 of the steer units causes these sun gears to provide reaction. The pinions 101 and 105 thus walk about sun gears 109 and 110 to drive carriers 102 and 106 and connected output shafts 12 and 14, respectively, at a reduced speed relative to the ring gear drives. Output speed in the first speed range forward drive which is thus a full hydrostatic drive is increased by increasing the motor speed of the hydrostatic propulsion drive unit 18 to its maximum value in the forward direction.

During operation in the first speed range forward drive, the carrier 61 of gearset 55 drives the connected ring gear 60 of gearset 54 in the forward direction. The forward sun gear and ring gear drives in gearset 54 cooperate to drive carrier 58 of this gearset in the forward direction. The carrier 58 in turn drives the driven members of clutch 89 in the reverse direction via gears 91 and 90. Prior to an upshift in forward drive, the forward drive clutch 88 is engaged. The direction of rotation of the transmission input is such that this clutch engagement causes shaft 86 to be driven in the reverse direction. Thus, the drive and driven members of clutch 89 rotate in the same direction with the speed of the driven members increasing with increasing hydrostatic propulsion motor speed. This arrangement enables the sizes of the operating gears to be selected so that at maximum hydrostatic propulsion motor speed in the forward direction in the first speed range drive, the speed of the driven members of clutch 89 has increased to that of the drive member so that there is no relative speed between the members of this clutch and thus this clutch is speed synchronized.

A shift from first to the second speed range forward drive is preferably accomplished when the above speed synchronous condition of clutch 89 is reached in the first speed range forward drive. The clutch 89 is then engaged and then brake 69 is released while both the forward drive clutch 88 and clutch 79 remain engaged. In the second speed range forward drive, power is transmitted hydrostatically to continue driving sun gear 51 of gearset 54 in the forward direction and mechanical drive is now provided from the transmission input to drive carrier 58 of this gearset in the same or forward direction. The mechanical drive and hydrostatic drive are combined by gearset 54 to provide hydromechanical drive that drives ring gear 60 in the forward direction. The ring gear 60 in turn drives the connected sun gear 71 of gear set 70 in the forward direction. This hydromechanical drive is transmitted by the locked up gearset 70 to drive the output shafts 12 and 14 to produce forward vehicle motion. In the second speed range forward drive, the forward speed component of sun gear 51 subtracts from the forward speed component of carrier 58 in the drive they cooperatively provide to ring gear 60. Thus, the forward speed of sun gear 51 subtracts from the speed of the hydromechanical drive to ring gear 72 and therefore from the transmission output speed. Transmission output speed in the second speed range forward drive is increased by reducing hydrostatic propulsion motor speed to zero and then increasing the speed to maximum motor speed in the reverse direction, the reverse motor speed providing sun gear 51 with an additive speed component. Downshifting from the second speed range forward drive to the first speed range forward drive also occurs with a speed synchronous condition at brake 69 by the drive to ring gear 68 from sun gear 52 and carrier 61 which drive reduces this ring gear's speed to zero at maximum motor speed in the forward direction in the second speed range drive.

During operation in the last half of the second speed range forward drive, the sun gear 52 of gearset 55 is being driven in the reverse direction by the hydrostatic propulsion motor 48 and the carrier 61 of this gearset is rotating with ring gear 60 in the forward direction. These rotations of sun gear 52 and carrier 61 cause ring gear 68 to rotate in the forward direction. The ring gear 68 in turn drives the driven members of clutch 92 in the reverse direction via gears 94 and 93 which is the same direction that the drive member of this clutch is being driven by the transmission input. This arrangement enables the sizes of the operating gears to be selected so that at maximum hydrostatic propulsion motor speed in the reverse direction in the second speed range drive, the drive and driven members of clutch 92 rotate at the same speed and therefore this clutch is speed synchronized.

The shift from second to the third speed range forward drive is preferably accomplished when the above speed synchronous condition of clutch 92 is reached in the second speed range forward drive. The clutch 92 is then engaged and then clutch 89 is released while both the forward drive clutch 88 and clutch 79 remain engaged. Mechanical drive and hydrostatic drive are now combined by gearset 55, the mechanical drive being provided to ring gear 68 through clutch 92 and gears 93 and 94 to drive this ring gear in the forward direction. The sun gear 52 rotates in he reverse direction at the initiation of this transmission drive and therefore the speed of the hydrostatic propulsion motor drive subtracts from that of the ring gear 68 in the drive they cooperatively provide to drive carrier 61 in the forward direction. The carrier 61, which is thus hydromechanically driven, in turn drives the connected sun gear 71 of gearset 70 in the forward direction. The hydromechanical drive is transmitted by the locked up gearset 70 to drive the output shafts 12 and 14 to produce forward vehicle motion. In the third speed range forward drive, the reverse speed component of sun gear 52 subtracts from the speed of the hydromechanical drive to carrier 61 and therefore from the transmission output speed. Thus, output speed in the third speed range forward drive is increased by reducing hydrostatic propulsion motor speed from the maximum value in the reverse direction to zero and then increasing this speed to maximum value in the forward direction, the forward motor speed providing sun gear 52 with an additive speed component. Downshifting from third to the second speed range forward drive also occurs with a speed synchronous condition at clutch 89 by the drive to carrier 58 in the third speed range forward drive.

During operation in the third speed range forward drive, the locked up gearset 70 causes carrier 74 to rotate in the forward direction and this carrier in turn drives the driven members of clutch 96 in the reverse direction via gears 98 and 97 which is the same direction that the drive member of this clutch is being driven by the transmission input. This arrangement enables the sizes of the operating gears to be selected so that a maximum hydrostatic propulsion motor speed in the forward direction in the third speed range drive, the drive and driven members of clutch 96 rotate at the same speed and therefore this clutch is speed synchronized.

The shift from third to the fourth speed range forward drive is preferably accomplished when the above speed synchronous condition of clutch 96 is reached in the third speed range forward drive. The clutch 96 is then engaged and then clutch 79 is released while both the forward drive clutch 88 and clutch 92 remain engaged. Thus, mechanical drive and hydrostatic drive continue to be combined by gearset 55, the mechanical drive being provided to ring gear 68 through clutch 92 to drive this ring gear in the forward direction. The sun gear 52 rotates in the forward direction at the initiation of this transmission drive and therefore the speed of the hydrostatic propulsion motor drive adds to that of ring gear 68 in the drive they cooperatively provide to drive carrier 61 in the forward direction. The carrier 61, which is thus hydromechanically driven, in turn drives the connected sun gear 71 of gearset 70 in the forward direction like in the third speed range forward drive. Hydromechanical drive and mechanical drive are now combined by gearset 70, the hydromechanical drive being provided to sun gear 71 as just described and the mechanical drive being provided to carrier 74 through clutch 96 and gears 97 and 98 to drive this carrier in the forward direction. Since the sun gear 71 is being driven in the forward direction by carrier 61, its speed component subtracts from that of the forwardly driven carrier 74 in the drive they cooperatively provide to drive ring gear 72 in the forward direction and thus drive the output shafts 12 and 14 to produce forward vehicle motion. Thus, transmission output speed in the fourth speed range forward drive is increased by reducing hydrostatic propulsion motor speed from its maximum value in the forward direction to zero and then increasing this speed to the maximum value in the reverse direction. This effects a continuous decrease in the forward speed of sun gear 71 and thereby a continuous increase in the forward speed of ring gear 72 and thus a continuous increase in transmission output speed. Downshifting from fourth to the third speed range forward drive also occurs with a speed synchronous condition of the clutch 79 since the drive and driven members of this clutch rotate at the same speed and in the same direction at the initiation of the fourth speed range forward drive.

During operation in the last half of the fourth speed range forward drive, the sun gear 51 of gearset 54 is being driven in the reverse direction by the hydrostatic propulsion motor 48 and the ring gear 60 of this gearset is rotating with carrier 61 in the forward direction. These rotations of sun gear 51 and ring gear 60 cause carrier 58 to rotate in the forward direction. The carrier 58 in turn drives the driven members of clutch 89 in the reverse direction and because of the reduced forward speed of carrier 61 and thus ring gear 60 described above, the clutch 89 is speed synchronized for an upshift like the first speed range forward drive but in this instance at the maximum hydrostatic propulsion motor speed in the reverse direction.

A shift from fourth to the fifth speed range forward drive is preferably accomplished when the above speed synchronous condition of clutch 89 is reached in the fourth speed range drive. The clutch 89 is then engaged and then clutch 92 is released while both the forward drive clutch 88 and clutch 96 remain engaged. Mechanical drive and hydrostatic drive are now combined by gearset 54 like in the second speed range forward drive to drive ring gear 60 in the forward direction. The sun gear 51 rotates in the reverse direction at the initiation of the transmission drive and therefore the speed of the hydrostatic propulsion motor drive adds to that of carrier 58 in the drive they cooperatively provide to drive ring gear 60 in the forward direction. The ring gear 60, which is thus hydromechanically driven, in turn drives the connected sun gear 71 of gearset 70 in the forward direction via carrier 61. The forward speed component of sun gear 71 subtracts from the forward speed component of carrier 74 in the drive they cooperatively provide to drive ring gear 72 in the forward direction and thus drive the output shafts 12 and 14 to produce forward vehicle motion. Thus, output speed in the fifth speed range forward drive is increased by continuing to decrease the forward speed of sun gear 71 which is effected by reducing hydrostatic propulsion motor speed from the maximum value in the reverse direction to zero and then increasing the speed to the maximum value in the forward direction. Downshifting from fifth to the fourth speed range forward drive range also occurs with a speed synchronized condition of clutch 92 by the drive to ring gear 68 at the initiation of the fifth speed ange forward drive.

During operation in the last half of the fifth speed range forward drive, the drive to ring gear 68 from sun gear 52 and carrier 61 reduces this ring gear's speed to zero at maximum motor speed in the forward direction like in the second speed range forward drive. Thus, the brake 69 is speed synchronized at maximum motor speed in the forward direction in the fifth speed range forward drive.

The shift from fifth to the sixth and highest speed range forward drive is preferably accomplished when the above speed synchronous condition of brake 69 is reached in the fifth speed range forward drive. The brake 69 is then engaged and then clutch 89 is released while both the forward drive clutch 88 and clutch 96 remain engaged. Hydrostatic drive and mechanical drive are now combined by gear set 70 to provide a hydromechanical drive that drives ring gear 72 in the forward direction. Like in the fourth and fifth speed range forward drives, transmission output speed is increased by continuing to decrease the forward speed of sun gear 71. In the hydrostatic drive, the sun gear 52 at the initiation of the sixth speed range forward drive is rotating in the forward direction at maximum motor speed to drive sun gear 71 in the forward direction. Thus, transmission output speed in the sixth speed range forward drive is increased by reducing hydrostatic propulsion motor speed from its maximum value in the forward direction to zero. For further increase in transmission output speed, the hydrostatic propulsion motor speed may then be increased to its maximum value in the reverse direction. The reverse rotation of sun gear 52 causes the carrier 61 and thus sun gear 71 to rotate in the reverse direction and thus provides the sun gear 71 with a speed component that adds to that of carrier 74 to continue increasing the speed of ring gear 72 and thus the transmission output speed. Downshifting from the sixth to the fifth speed range forward drive also occurs with a speed synchronous condition at the clutch 89 at the initiation of the sixth speed range forward drive by the drive to carrier 58 like in the third speed range forward drive because of the reduced forward speed of ring gear 60 described above.

Thus with the gearset 70 between the output from the other gearsets 54 and 55 and the transmission output, the gearset 70 operates to first transmit the drives available from the gearsets 54 and 55 in the lowest three speed range drives. Then, gearset 70 extends the speed range of each of these drives by combining them with a mechanical drive from the transmission input to provide the three higher speed range drives by a downshifting sequence of the gearsets 54 and 55.

Six speed range drives with synchronous shifting are also provided in reverse. These drives are effected by engaging the reverse drive clutch 84 instead of the forward drive clutch 88, operating the drive establishing devices in the manner previously described and operating the hydrostatic propulsion drive unit 18 in an inverted manner from that previously described. Thus, the reverse drives provide the same speed range coverage as the forward drives.

Describing now the steering operation, in all of the speed range drives in both forward and reverse steering of the differential type is provided by operation of the hydrostatic steer drive unit 26 to drive shaft 116. With shaft 116 now being driven in either the forward or reverse direction, the sun gears 109 and 110 which provided only reaction before are now caused to rotate in opposite directions at the same speed. For example, when sun gear 109 is driven in the same direction as ring gear 100 by the hydrostatic steer drive unit 26, its speed component adds to that of ring gear 100 and thus increases the speed of output shaft 12 while the speed component of sun gear 110 subtracts from that of ring gear 104 to decrease the speed of output shaft 14 by the same amount that the speed of shaft 12 has been increased. Alternatively, the speed of output shaft 14 can be increased while the speed of output shaft 12 is decreased to steer in the opposite direction.

In the FIG. 1 transmission arrangement with the sun gear 71 of gearset 70 being driven by the three drives available from gearsets 54 and 55, the speed range in each of the drives delivered to sun gear 71 is in effect expanded in the three highest drives by the factor of S/R where S is the number of teeth on the sun gear 71 and R is the number of teeth on the ring gear 72. The speed ranges of the drives from gearsets 54 and 55 may be further expanded by modifying the gearset 70 in the range planetary gearing 20 as shown in FIG. 2 wherein like numerals are employed to identify corresponding parts with the numbers appearing in FIG. 2 being primed. As shown in FIG. 2, only the gearset 70' is modified by having its ring gear 72' connected to shaft 78' and thus to carrier 61' and its sun gear 71' connected to shaft 80'. Carrier 74' which carries pinions 76' remains connected to gear 98' which meshes with gear 97', the latter gear being connectable via the clutch 96' to countershaft 86'. Lockup of the gearset 70' is effected by engagement of clutch 79' which connects the sun gear 71' and ring gear 72' as before. The sequence of operation of the transmission with the modified gearset 70' is the same as that described above for the transmission with the gearset 70' but with the result that the speed range in each of the drives from the other range gearing to gearset 70' is expanded in the three highest drives by the larger factor of R/S where R is the number of teeth on ring gear 72' and S is the number of teeth on sun gear 71'.

Where it is desired to minimize centrifugal loading in the pinion bearings in the gearset 70 and also to obtain an intermediate speed range expansion factor, the gearset 70 may be modified as shown in FIG. 3 where like numerals are employed to identify corresponding parts with the numbers appearing in FIG. 3 being double primed. In FIG. 3, the planetary gearset 70'' has its carrier 74'' connected to the shaft 78'' and thus to carrier 61'', its sun gear 71'' connected to the shaft 80'' and its ring gear 72'' connected to the gear 98''. Gear 98'' meshes with gear 97'' which is connectable to countershaft 86'' via the clutch 96''. The gearset 70'' has one set of pinions 76a'' supported on one set of spindles on carrier 74'' and in mesh with the sun gear 71''. Another set of pinions 76b'' supported on another set of spindles on carrier 74'' mesh with pinions 76a'' and ring gear 72''. In this modification the clutch 79'' is arranged to connect the carrier 74'' to sun gear 71'' to lock up gearset 70''. The operation of the transmission with the gearset 70'' is the same as that with the gearset 70 as described above but with the result that the speed range in each of the drives from the other range gearing to gearset 70'' is expanded in the three highest drives by the factor of R−S/S where R is the number of teeth on ring gear 72'' and S is the number of teeth on sun gear 71''. Thus, the expansion factor provided by the FIG. 3 modification is intermediate those of the FIGS. 1 and 2 arrangements and can be made equal to one (1.0) so that the speed range is the same in all of the drives. In the FIG. 3 modification, centrifugal loading in the pinion bearings in the gearset 70'' is at its highest at the maximum transmission output speed in the third speed range drive. Thereafter, this loading decreases in the successively higher speed range drives reaching zero at the midpoint in the sixth and highest speed range drive whereafter this loading then slightly increases with increasing transmission output speed to the speed limit of the sixth speed range drive. Thus, the centrifugal loading in the bearings of the pinions in gearset 70'' is considerably reduced as compared with the FIG. 1 and 2 arrangements where the carrier of this gearset is continuously driven at a speed proportional to the transmission input.

It will be understood that while the transmission has been illustrated with dual output for use in a track-laying vehicle, the transmission can also be adapted to a vehicle requiring only one transmission output. This may be accomplished by taking output directly from shaft 80, this shaft then serving as the transmission's output shaft.

The above described preferred embodiments are illustrative of the invention which may be modified within the scope of the appended claims.

I claim:

1. In a transmission the combination of an input shaft; an output shaft; variable speed ratio hydrostatic drive means drivingly connected to said input shaft; first, second and third planetary gearsets each having three members comprising sun gear member, a ring gear member and a carrier member carrying pinion means operatively geared with the sun gear member and the ring gear member; one member of said first and second gearsets drivingly connected to said hydrostatic drive means; brake means for braking another member of said first gearset; mechanical drive train means including a first clutch for selectively drivingly connecting said input shaft to another member of said second gearset; the third member of said first gearset, the third member of said second gearset and one member of said third gearset all being drivingly connected; mechanical drive train means including a second clutch for selectively drivingly connecting said input shaft to said another member of said first gearset; another member of said third gearset drivingly connected to aid output shaft; a third clutch for selectively locking up said third gearset; and mechanical drive train means including a fourth clutch for selectively drivingly connecting said input shaft to the third member of said third gearset whereby there is effected three drives in successively higher speed ranges between said input shaft and said output shaft when said third clutch is engaged and on sequential engagement of said brake, said first clutch and said second clutch and there is effected an additional three drives in successively higher speed ranges between said input shaft and said output shaft when said fourth clutch is engaged and on sequential engagement of said second clutch, said first clutch and said brake and whereby the speed ratio in all said drives is varied by varying the speed ratio of said hydrostatic drive means.

2. The transmission set forth in claim 1 and said one member, said another member and said third member of said third gearset being the sun gear member, the ring gear member and the carrier member, respectively.

3. The transmission set forth in claim 1 and said one member, said another member and said third member of said third gearset being the ring gear member, the sun gear member and the carrier member, respectively.

4. The transmission set forth in claim 1 and said one member, said another member and said third member of said third gearset being the carrier member, the sun gear member and the ring gear member, respectively, the pinion means in said third gear set comprising one pinion meshing with the sun gear member and another pinion meshing with said one pinion and the ring gear member.

5. The transmission set forth in claim 1 and forward and reverse drive means for selectively providing a forward drive and a reverse drive between said input shaft and all of said mechanical drive means.

6. The transmission set forth in claim 5 and a pair of steer planetary gear means each having a sun gear member, a ring gear member and a carrier member carrying a pinion meshing with the sun gear member and the ring gear member; means drivingly connecting said output shaft to one pair of like members of said steer planetary gear means; direction reversing gear train means operatively connecting another pair of like members of said steer planetary gear means; variable speed ratio hydrostatic steer drive means for operatively drivingly connecting said input shaft to said another pair of like members of said steer planetary gear means whereby the remaining pair of like members of said steer planetary gear means provide to output drives having equal speed on establishment of said speed range drives with a differential speed effected between said output drives to produce steering whenever said hydrostatic steer drive means drives said direction reversing gear train wherein said differential speed is varied by varying the speed ratio of said hydrostatic steer drive means.

7. In a transmission the combination of an input shaft; an output shaft; variable speed ratio hydrostatic drive means drivingly connected to said input shaft; a pair of planetary gearsets each having a sun gear member, a ring gear member and a carrier member carrying pinion means operatively geared with the sun gear member and the ring gear member; one member of one gearset drivingly connected to said hydrostatic drive means; brake for braking another member of said one gearset; the third member of said one gearset drivingly connected to one member of the other gearset; another member of said other gearset drivingly connected to said output shaft; a first clutch for selectively locking up and other gearset; and mechanical drive train means including a second clutch for selectively drivingly connecting said input shaft to the third member of said other gearset whereby there is effected a drive between said input shaft and said output shaft when both said brake and said first clutch are engaged and there is effected another drive in a higher speed range between said input shaft and said output shaft when both said brake and said second clutch are engaged and whereby the speed ratio in both said drives is varied by varying e speed ratio of said hydrostatic drive means.

8. In a transmission the combination of an input shaft; an output shaft; variable speed ratio hydrostatic drive means drivingly connected to said input shaft; a pair of planetary gearsets each having a sun gear member, a ring gear member and a carrier member having pinion means operatively geared with the sun gear member and the ring gear member; one member of one gearset drivingly connected to said hydrostatic drive means; mechanical drive train means including a first clutch for selectively drivingly connecting said input shaft to another member of said one gearset; the third member of said one gearset drivingly connected to one member of the other gearset; another member of said other gearset drivingly connected to said output shaft; second clutch for selectively locking up said other gearset; and mechanical drive train means including a third clutch for selectively drivingly connecting said input shaft to the third member of said other gearset whereby there is effected a drive between said input shaft and said output shaft when both said first clutch and said second clutch are engaged and there is effected a drive in a higher speed range between said input shaft and said output shaft when both said first clutch and said third clutch are engaged and whereby the speed ratio in both said drives is varied by varying the speed ratio of said hydrostatic drive means.